R. DENMARK.
BELT-SHIPPING ATTACHMENT FOR PULLEYS.
No. 186,318. Patented Jan. 16, 1877.
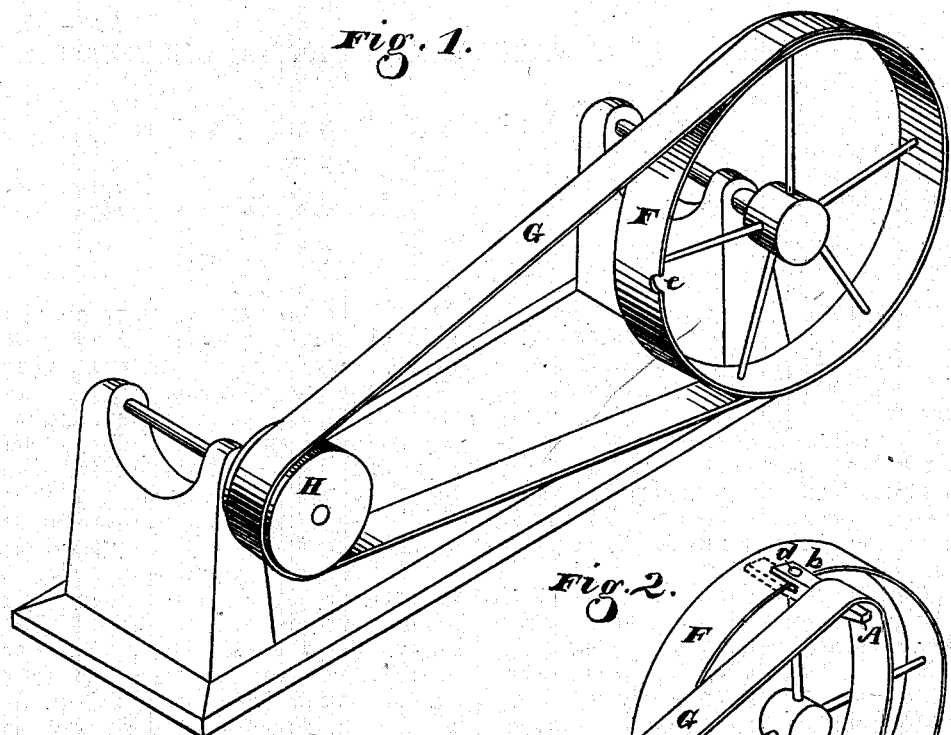
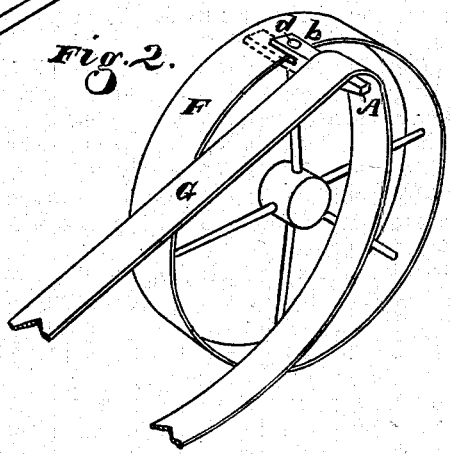
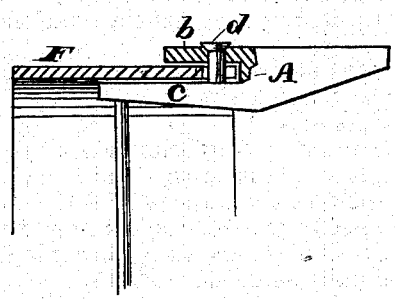

UNITED STATES PATENT OFFICE.

RUFUS DENMARK, OF WASHINGTON CORNERS, CALIFORNIA.

IMPROVEMENT IN BELT-SHIPPING ATTACHMENTS FOR PULLEYS.

Specification forming part of Letters Patent No. 186,318, dated January 16, 1877; application filed June 21, 1876.

*To all whom it may concern:*

Be it known that I, RUFUS DENMARK, of Washington Corners, Alameda county, State of California, have invented a Belt-Shipping Attachment for Pulleys; and I do hereby declare the following description and accompanying drawings are sufficient to enable any person skilled in the art or science to which it most nearly appertains to make and use my said invention without further invention or experiment.

My invention relates to a novel device for shipping belts upon pulleys; and it consists of a removable arm, which fits upon the flange of the pulley. The belt is hung over this arm, and the motion of the machinery will carry the belt to its place upon the pulley, allowing the arm to fall off clear of the pulley after this is accomplished.

Referring to the accompanying drawings for a more complete explanation of my invention, Figure 1 is a perspective view of a pulley, showing the notch *e*. Fig. 2 shows the device in place. Fig. 3 is a section.

It is often necessary in many kinds of mechanism (as, for example, the field-engines or horse-powers which are employed to drive thrashing-machines) to throw the driving-belts entirely off the pulleys, and when these belts are large or tight, or the machinery heavy, it is very difficult to replace the belt upon the pulley.

My apparatus for doing this consists of a bar, A, either made in two parts bolted together or formed in one piece; but in either case it has a thin projection, *b*, which lies upon the outside of the pulley F, and an arm, *c*, which projects beneath the rim as far as the line of the spokes. A stout pin, *d*, passes through this bar, so that it crosses the slot formed between the two parts of the bar which clasps the rim of the pulley. A notch, *e*, is made in the edge of the pulley, and when the bar is slipped upon the pulley, as shown in Fig. 2, the arm *c* will rest behind a spoke of the wheel, and the pin *d* will fit into the notch *e* to form a fulcrum, and prevent the bar from being pulled from its place by the drag of the belt. The bar then projects at right angles with the plane of the pulley's motion from the rim of the wheel, and all that will be necessary to ship the belt G upon the pulley will be to hang it over the arm A, and set the engine in motion. The arm will run the belt into its place at once, and as soon as it arrives at the point where the belt leaves the pulley in its passage to the other pulley H the arm will be free to fall off, which it does, and leaves no dangerous projection, as would be the case if it were a permanent attachment to the wheel.

Having thus described my invention, what I claim as new, and desire to secure by Letters Patent, is—

A device for shipping belts, consisting of the bar A, having the arms *b* and *c* to clasp the rim of the wheel, and the pin *d* fitting into the slot *e*, so as to retain the arm in place until the belt is shipped, and then allow it to fall off, substantially as herein described.

In witness whereof I have hereunto set my hand.

RUFUS DENMARK.

Witnesses:
 GEO. H. STRONG,
 CHAS. G. PAGE.